(12) United States Patent
Yashiki et al.

(10) Patent No.: US 10,385,736 B2
(45) Date of Patent: Aug. 20, 2019

(54) COMBINED CYCLE POWER PLANT AND START-UP METHOD OF THE SAME

(71) Applicant: Mitsubishi Hitachi Power Systems, Ltd., Nishi-ku, Yokohama (JP)

(72) Inventors: Tatsuro Yashiki, Tokyo (JP); Yasuhiro Yoshida, Tokyo (JP); Takuya Yoshida, Tokyo (JP); Miyuki Kawata, Tokyo (JP); Eunkyeong Kim, Tokyo (JP); Kazunori Yamanaka, Yokohama (JP); Norihiro Iyanaga, Yokohama (JP); Fumiyuki Suzuki, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 487 days.

(21) Appl. No.: 15/214,502

(22) Filed: Jul. 20, 2016

(65) Prior Publication Data

US 2017/0022847 A1 Jan. 26, 2017

(30) Foreign Application Priority Data

Jul. 23, 2015 (JP) .................................. 2015-145451

(51) Int. Cl.
*F01K 23/10* (2006.01)
*F01K 23/16* (2006.01)
(Continued)

(52) U.S. Cl.
CPC ............ *F01K 23/101* (2013.01); *F01D 13/00* (2013.01); *F01D 15/10* (2013.01); *F01D 17/105* (2013.01);
(Continued)

(58) Field of Classification Search
CPC ...... F01K 23/101; F01K 23/16; F01K 23/106; F01K 23/108; F01K 3/22; F01K 13/02;
(Continued)

(56) References Cited

U.S. PATENT DOCUMENTS 5,628,179 A 5/1997 Tomlinson
6,116,017 A 9/2000 Mori et al.
(Continued)

FOREIGN PATENT DOCUMENTS

| EP | 2 801 759 A1 | 11/2014 |
| JP | 6-294305 A | 10/1994 |
| JP | 2009-281248 A | 12/2009 |

OTHER PUBLICATIONS

Extended European Search Report issued in counterpart European Application No. 16180592.4 dated Nov. 28, 2016 (seven (7) pages).

*Primary Examiner* — Phutthiwat Wongwian
*Assistant Examiner* — Loren C Edwards
(74) *Attorney, Agent, or Firm* — Crowell & Moring LLP

(57) ABSTRACT

There is provided a combined cycle power plant in which a high-pressure steam turbine and an intermediate-pressure steam turbine can operate in a state where amounts of thermal effect thereof are close to a limit value, and capable of reducing start-up time. A combined cycle power plant includes: an exhaust heat recovery boiler that includes a high-pressure superheater which superheats steam for a high-pressure steam turbine, and a reheater which reheats steam for an intermediate-pressure steam turbine; bypass pipes through which steam bypasses the high-pressure superheater and the reheater; bypass valves that regulate flow rates of steam which flows through the bypass pipes; and a bypass controller that controls the bypass valves such that a difference between thermal effect-amount margins of the turbines is decreased.

5 Claims, 8 Drawing Sheets

(51) Int. Cl.
*F22G 5/04* (2006.01)
*F22G 5/18* (2006.01)
*F01D 13/00* (2006.01)
*F01D 15/10* (2006.01)
*F01D 17/10* (2006.01)
*F01D 17/14* (2006.01)
*F01D 21/00* (2006.01)
*F02C 6/18* (2006.01)
*F02C 9/32* (2006.01)

(52) U.S. Cl.
CPC ......... *F01D 17/145* (2013.01); *F01D 21/003* (2013.01); *F01K 23/108* (2013.01); *F01K 23/16* (2013.01); *F02C 6/18* (2013.01); *F02C 9/32* (2013.01); *F22G 5/04* (2013.01); *F22G 5/18* (2013.01); *F05D 2220/32* (2013.01); *F05D 2220/72* (2013.01); *F05D 2220/76* (2013.01); *F05D 2260/606* (2013.01); *Y02E 20/16* (2013.01)

(58) Field of Classification Search
CPC .......... F01D 13/00; F01D 15/10; F01D 17/00; F01D 17/02; F01D 17/08; F01D 17/085; F01D 17/105; F01D 17/145; F01D 19/00; F01D 19/02; F01D 21/003; F02C 6/18; F02C 9/32; F22G 5/04; F22G 5/18; F05D 2220/32; F05D 2220/72; F05D 2220/76; F05D 2260/606; F05D 2260/85; F05D 2260/941; F05D 2270/114; Y02E 20/16
USPC .......................................................... 60/783
See application file for complete search history.

(56) References Cited

U.S. PATENT DOCUMENTS

| | | |
|---|---|---|
| 6,178,734 B1 | 1/2001 | Shibuya et al. |
| 2009/0288416 A1 | 11/2009 | Matsumoto et al. |
| 2013/0098313 A1* | 4/2013 | Pang ............... F01K 23/108 122/460 |

* cited by examiner

COMBINED CYCLE POWER PLANT AND START-UP METHOD OF THE SAME

BACKGROUND OF THE INVENTION

Field of the Invention

The present invention relates to a combined cycle power plant and a start-up method of the combined cycle power plant.

Background Art

In a combined cycle power plant, exhaust gas discharged after being used in a gas turbine is guided to an exhaust heat recovery boiler, then steam is generated using exhaust heat which is recovered, and then a steam turbine is driven using the steam. Since an amount of power generation significantly varies in a power plant using renewable energy represented by wind power or solar power, it is demanded to shorten the start-up time of the combined cycle power plant such that instability of a power system is reduced.

Therefore, at the time of start-up of the combined cycle power plant, the steam, which is supplied to the steam turbine, needs to have a rapid increase in temperature and a flow rate. However, as a result, a front surface of a turbine rotor has a more rapid increase in temperature than the inside thereof, which results in a temperature gradient in a radial direction of the turbine rotor, and thus thermal stress is increased. A large increase in the thermal stress can cause a reduction in the service life of the turbine rotor. In addition, in a case where the steam has a significant temperature change, a difference in thermal expansion is generated between the turbine rotor and a casing due to a difference in heat capacity. When the difference in thermal expansion is increased, there is a possibility that the rotating turbine rotor and the stationary casing come into contact with each other and are damaged. Therefore, there is a need to appropriately control the temperature or the flow rate of the steam at the time of start-up such that the thermal stress or the difference in thermal expansion does not exceed a limit value.

Here, regarding start-up control of a steam turbine, technology is known, in which a high-speed start-up of a steam turbine is performed, in a condition in which thermal stress and a difference in thermal expansion in a certain period of time from a current time point are predicted and calculated, and predicted values of the thermal stress and the difference in thermal expansion are each controlled to be smaller than a limit value (see JP-2009-281248-A). In JP-2009-281248-A, the thermal stress and the difference in thermal expansion are predicted and calculated based on a measurement value of a state quantity (specifically, for example, a temperature or pressure of steam in an inlet of the steam turbine) of a plant, and then an amount for a plant operation is determined such that the predicted values are each smaller than the limit value.

SUMMARY OF THE INVENTION

Incidentally, in the combined cycle power plant, in order to achieve an increase in output and high efficiency, a reheating type is often employed, in which after a high-pressure steam turbine is driven using high-pressure steam (main steam) generated in an exhaust heat recovery boiler, the steam discharged from the high-pressure turbine is caused to return to the exhaust heat recovery boiler, and then an intermediate-pressure steam turbine is driven using the steam which is reheated (reheated steam).

In a reheating type of combined cycle power plant, as illustrated in FIG. 9, since behavior due to an amount of thermal effect such as thermal stress is different between the high-pressure steam turbine and the intermediate-pressure steam turbine, a difference in a margin with respect to the limit value is generated. Therefore, the amount for the plant operation is determined based on a smaller one of a thermal effect-amount margin of the high-pressure steam turbine and a thermal effect-amount margin of the intermediate-pressure steam turbine. In this case, it is possible to operate one of the high-pressure steam turbine or the intermediate-pressure steam turbine, which has a smaller margin, in a state in which the amount of the thermal effect is close to the limit value; however, it is not possible to operate the other one, which has a greater margin, in the state in which the amount of the thermal effect is close to the limit value. Hence, there is room for improvement when it comes to achieving a reduction in the start-up time.

The present invention is made in consideration of the circumstances described above, and an object thereof is to provide a combined cycle power plant in which both a high-pressure steam turbine and an intermediate-pressure steam turbine can operate in a state in which the amounts of thermal effect thereof are close to a limit value, and it is possible to reduce start-up time.

In order to achieve the object described above, a combined cycle power plant includes: a gas turbine that is driven with hot gas generated using fuel gas; a high-pressure steam turbine and an intermediate-pressure steam turbine that are driven with steam; a generator that converts rotative power of the gas turbine, the high-pressure steam turbine, and the intermediate-pressure steam turbine into electric power; an exhaust heat recovery boiler that uses exhaust gas from the gas turbine as a heat source, and includes a high-pressure superheater which superheats high-pressure steam and supplies the superheated steam to the high-pressure steam turbine, and a reheater which reheats exhaust steam from the high-pressure steam turbine and supplies the reheated steam to the intermediate-pressure steam turbine; a plurality of bypass paths through which steam or exhaust gas bypasses each of the high-pressure superheater and the reheater; a plurality of bypass flow regulators that regulate flow rates of steam or exhaust gas which flows through the plurality of bypass paths; and a bypass controller that controls the plurality of bypass flow regulators such that a difference between a thermal effect-amount margin of the high-pressure steam turbine and a thermal effect-amount margin of the intermediate-pressure steam turbine is decreased.

According to the invention, both a high-pressure steam turbine and an intermediate-pressure steam turbine can operate in a state in which amounts of thermal effect thereof are close to a limit value, and it is possible to reduce start-up time.

DETAILED DESCRIPTION OF THE INVENTION

A first embodiment of the invention is described with reference to the drawings.

Figure 1:
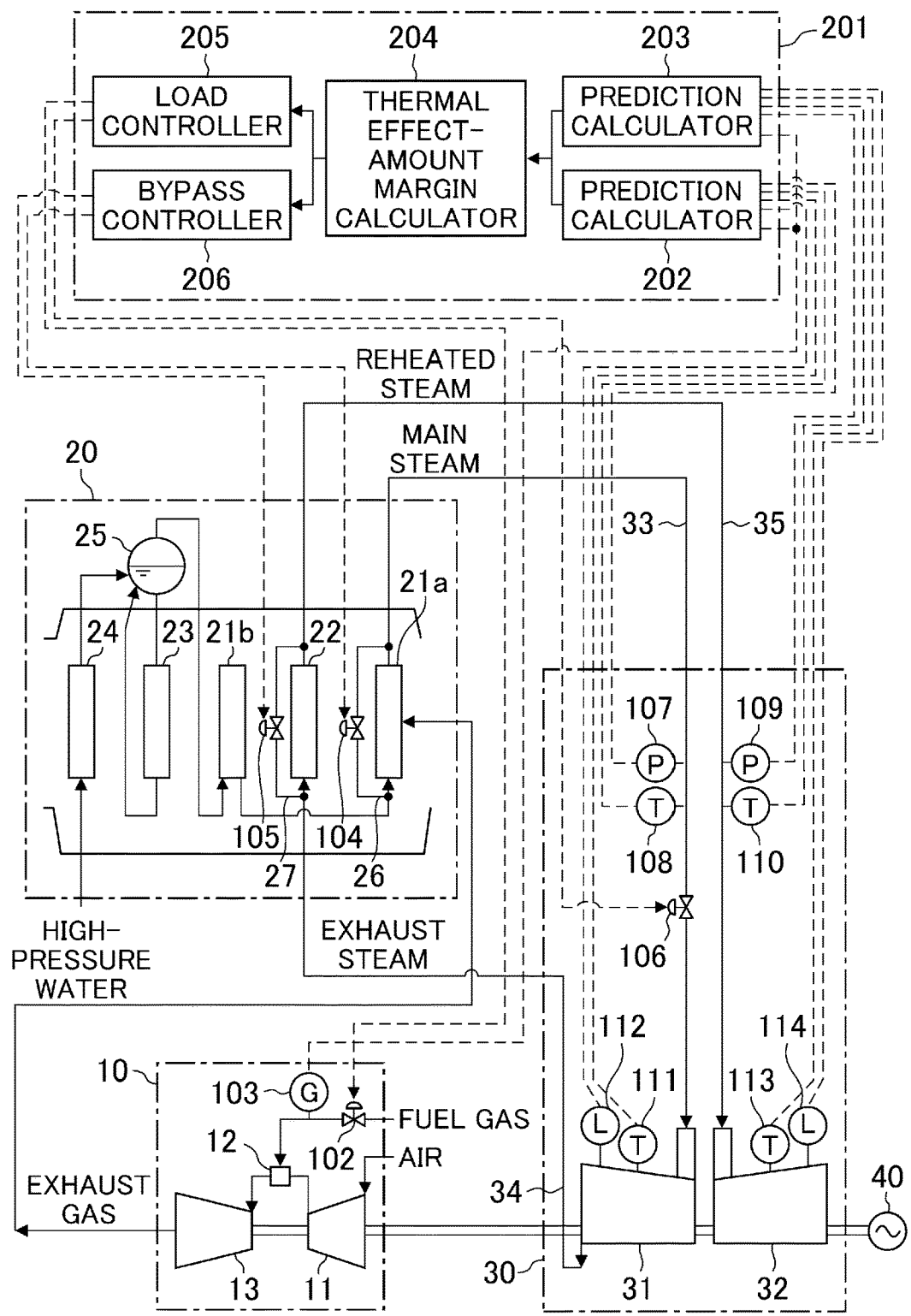
FIG. 1 is a schematic diagram illustrating a configuration of a combined cycle power plant according to a first embodiment of the invention.

FIG. 1 is a schematic diagram illustrating a configuration of a combined cycle power plant according to the embodiment of the invention.

The combined cycle power plant of the embodiment includes a gas turbine 10, an exhaust heat recovery boiler 20, a steam turbine 30, a generator 40, and a start-up controller 201. The steam turbine 30 includes a high-pressure steam turbine 31 and an intermediate-pressure steam turbine 32.

The gas turbine 10 includes a compressor 11, a combustor 12, and a turbine 13. The compressor 11 suctions and pressurizes air in an atmospheric condition and feeds generated compressed air to the combustor 12. The combustor 12 mixes and combusts the compressed air (combusting air) from the compressor 11 and fuel gas, and feeds the generated high temperature and pressure combustion gas to the turbine 13. The turbine 13 is driven with the combustion gas from the combustor 12, and drives the compressor 11 joined on the same shaft. In addition, the turbine drives the generator 40 joined on the same shaft along with the high-pressure steam turbine 31 and the intermediate-pressure steam turbine 32. The generator 40 converts rotative power of the turbine 13, the high-pressure steam turbine 31, and the intermediate-pressure steam turbine 32 into electric power. Exhaust gas discharged after being used in the turbine 13 is fed to the exhaust heat recovery boiler 20.

A fuel gas regulating valve 102 is provided on a supply path of the fuel gas to the combustor 12 of the gas turbine 10 such that an amount of supply of the fuel gas is adjusted by the fuel gas regulating valve 102. The fuel gas regulating valve 102 functions as an adjusting device that adjusts a plant load of the combined cycle power plant. In addition, a flowmeter 103 is provided on a downstream side of the fuel gas regulating valve 102 on the supply path of the fuel gas such that a flow rate of supply of the fuel gas is measured by the flowmeter 103.

The exhaust heat recovery boiler 20 generates steam for driving the steam turbine 30 with the exhaust gas from the turbine 13 as a heat source and includes high-pressure superheaters 21a and 21b, a reheater 22, a high-pressure evaporator 23, a high-pressure economizer 24, and a high-pressure steam drum 25. The exhaust gas fed to the exhaust heat recovery boiler 20 passes through the high-pressure superheater 21a, the reheater 22, the high-pressure superheater 21b, the high-pressure evaporator 23, and the high-pressure economizer 24, in this order, and is subjected to heat recovery, and thereby the exhaust gas has a drop in temperature, and then is released into the atmosphere from a chimney (not illustrated).

High-pressure water which is supplied to the exhaust heat recovery boiler 20 is heated in the high-pressure economizer 24, then is fed to the high-pressure evaporator 23 through the high-pressure steam drum 25, and then is converted into high-pressure steam in the high-pressure evaporator 23. The high-pressure steam obtained in the high-pressure evaporator 23 is fed to and superheated in the high-pressure superheater 21b through the high-pressure steam drum 25, and is further fed to and superheated in the high-pressure superheater 21a. The high-pressure steam (main steam) superheated in the high-pressure superheater 21a is supplied to the high-pressure steam turbine 31 through a main steam pipe 33. In this manner, the high-pressure steam turbine 31 is driven.

The steam discharged from the high-pressure steam turbine 31 is fed to the reheater 22 through an exhaust steam pipe 34. The steam (reheated steam) superheated in the reheater 22 is supplied to the intermediate-pressure steam turbine 32 through a reheated steam pipe 35. In this manner, the intermediate-pressure steam turbine 32 is driven.

Here, as one of the characteristics of the embodiment, a bypass pipe 26 (bypass path) for allowing the steam to bypass the high-pressure superheater 21a is provided, and a bypass valve 104 (bypass flow regulator) is provided on the bypass pipe 26. In addition, a bypass pipe 27 (bypass path) for allowing the steam to bypass the reheater 22 is provided, and a bypass valve 105 (bypass flow regulator) is provided on the bypass pipe 27. The bypass valves 104 and 105 regulate flow rates of the steam which flows through the bypass pipes 26 and 27.

A turbine control valve 106 is provided on the main steam pipe 33. The turbine control valve adjusts a flow rate of steam which is supplied to the steam turbine 30, and can function as an adjusting device that adjusts a load of the steam turbine 30. A pressure gauge 107 and a thermometer 108 are provided on the main steam pipe 33 on the upstream side of the turbine control valve 106. The pressure gauge 107 and the thermometer 108 measure pressure and temperature of the main steam, respectively, which flows through the main steam pipe 33. Similarly, a pressure gauge 109 and a thermometer 110 are provided on the reheated steam pipe 35. The pressure gauge 109 and the thermometer 110 measure pressure and temperature of the reheated steam, respectively, which flows through the reheated steam pipe 35.

A thermometer 111 and a thermal expansion difference meter 112 are provided on the high-pressure steam turbine 31. The thermometer 111 measures a temperature of metal of a first-stage casing or the like of the high-pressure steam turbine 31, and the thermal expansion difference meter 112 measures a difference in thermal expansion in an axial direction between a rotor and a casing of the high-pressure steam turbine 31. Similarly, a thermometer 113 and a thermal expansion difference meter 114 are provided on the intermediate-pressure steam turbine 32. The thermometer 113 measures a temperature of metal of a first-stage casing or the like of the intermediate-pressure steam turbine 32, and the thermal expansion difference meter 114 measures a difference in thermal expansion between a rotor and a casing in the axial direction thereof.

Various measurement values indicating state quantities of a plant are input as measurement value data to the start-up controller 201. For example, the measurement values include a flow rate of supply of the fuel gas measured in the flowmeter 103, pressure and temperature of the main steam measured by the pressure gauge 107 and the thermometer 108, pressure and temperature of the reheated steam measured by the pressure gauge 109 and the thermometer 110, temperature of the first-stage metal of the high-pressure steam turbine 31 measured by the thermometer 111, a difference in thermal expansion of the high-pressure steam turbine 31 measured by the thermal expansion difference meter 112, temperature of the first-stage metal of the intermediate-pressure steam turbine 32 measured by the thermometer 113, and a difference in thermal expansion of the intermediate-pressure steam turbine 32 measured by the thermal expansion difference meter 114. A state quantity other than the values listed above maybe input to the start-up controller 201. For example, a flowmeter may be provided on a supply path of air to the compressor 11 of the gas turbine 10, and an amount of supply of the air is measured and input to the start-up controller 201. In this case, a configuration may be employed, in which an inlet guide vane (IGV) is provided on the supply path of air and adjusts the amount of supply of air.

The start-up controller 201 includes elements of prediction calculators 202 and 203, a thermal effect-amount margin calculator 204, a load controller 205, and a bypass controller 206.

The prediction calculators 202 and 203 predict and calculate amounts of thermal effect in a certain period from the current time point to the future, based on the input measurement value data. The amount of the thermal effect includes thermal stress applied to a turbine rotor of the steam turbine 30 at the time of a start-up operation of the combined cycle power plant, a difference in thermal expansion in the axial direction between the turbine rotor and the casing in which the turbine rotor is accommodated, or the like, and means a state quantity of the steam turbine 30 which changes depending on a rapid increase in temperature of steam, pressure of steam, or the like, at the time of the start-up. In the specification of the present application, in a case where just the term, the "amount of the thermal effect" is used, the amount of the thermal effect means the thermal stress and the difference in thermal expansion. In addition, in a case where just the term, "thermal stress" is used, the thermal stress means thermal stress in the turbine rotor of the steam turbine 30. In a case where just the term, "difference in thermal expansion" is used, the difference in thermal expansion means a difference in thermal expansion in the axial direction between the turbine rotor and the casing of the steam turbine 30, in which the turbine rotor is accommodated. The prediction calculator 202 predicts and calculates an amount of thermal effect of the high-pressure steam turbine 31 and the prediction calculator 203 predicts and calculates an amount of thermal effect of the intermediate-pressure steam turbine 32.

The thermal effect-amount margin calculator 204 calculates a thermal effect-amount margin of the high-pressure steam turbine 31 and a thermal effect-amount margin of the intermediate-pressure steam turbine 32, based on a predicted value of an amount of thermal effect of the high-pressure steam turbine 31 and a predicted value of an amount of thermal effect of the intermediate-pressure steam turbine 32 calculated by the prediction calculators 202 and 203. Here, the thermal effect-amount margin means a deviation between the predicted value of the amount of thermal effect and a preset limit value.

The load controller 205 calculates and outputs instruction values to the fuel gas regulating valve 102 and the turbine control valve 106 such that the amount of thermal effect of the high-pressure steam turbine 31 and the amount of thermal effect of the intermediate-pressure steam turbine 32 do not exceed the limit value, based on the thermal effect-amount margin of the high-pressure steam turbine 31 and the thermal effect-amount margin of the intermediate-pressure steam turbine 32 calculated by the thermal effect-amount margin calculator 204. In this manner, openings of the fuel gas regulating valve 102 and the turbine control valve 106 are adjusted, for example, by PID control.

The bypass controller 206 calculates and outputs instruction values to the bypass valves 104 and 105, based on the thermal effect-amount margin of the high-pressure steam turbine 31 and the thermal effect-amount margin of the intermediate-pressure steam turbine 32 calculated by the thermal effect-amount margin calculator 204, such that a difference between the margins is smaller than a predetermined value set in advance. In this manner, openings of the bypass valves 104 and 105 are adjusted, for example, by PID control.

Figure 2:
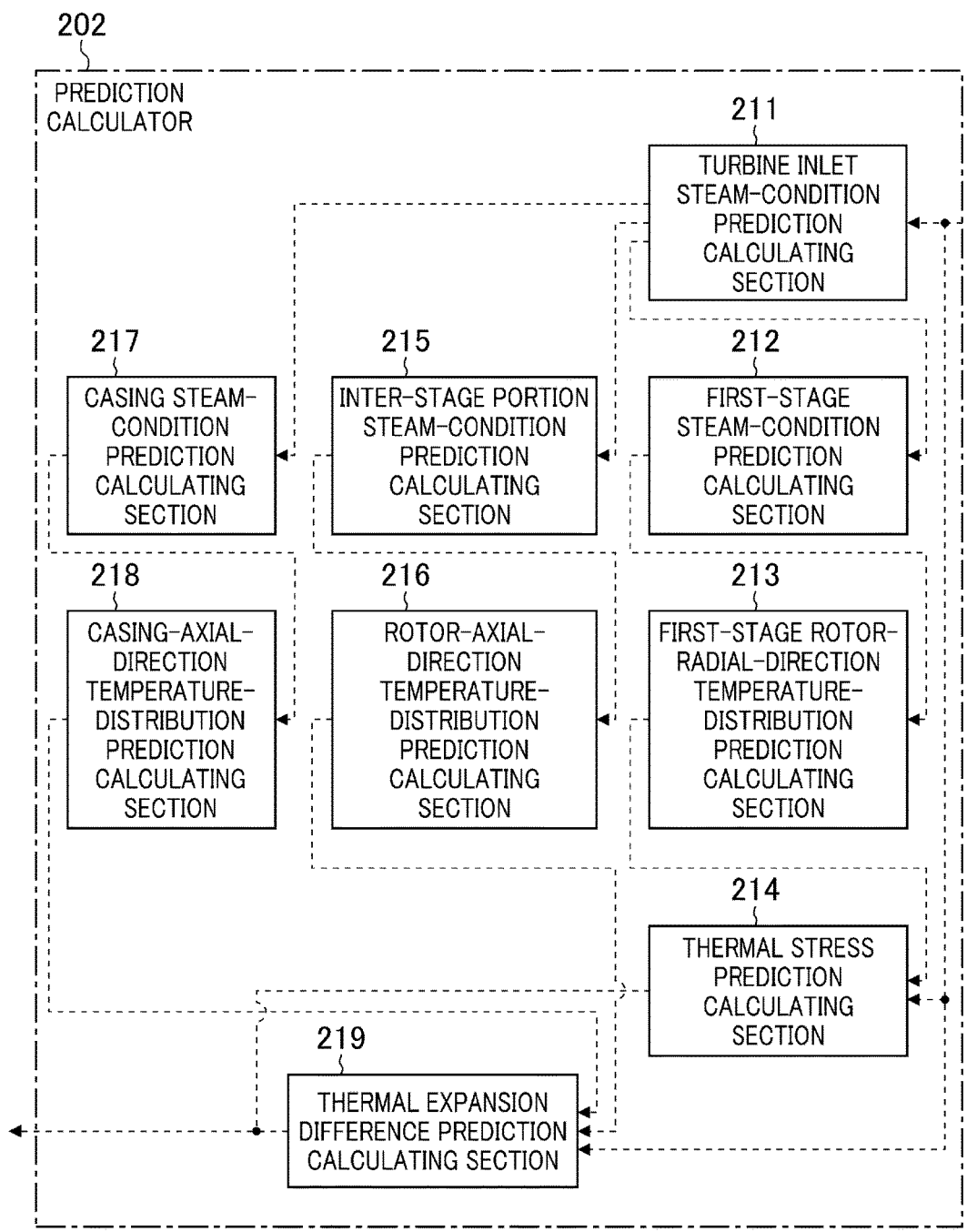
FIG. 2 is a block diagram illustrating a functional configuration of a prediction calculator according to the first embodiment of the invention.

Next, the prediction calculator 202 will be described in detail. FIG. 2 is a block diagram illustrating a functional configuration of the prediction calculator 202 according to the embodiment. It should be noted that the prediction calculator 203 has the same configuration as the prediction calculator 202, and thus description of the prediction calculator 203 is omitted.

The prediction calculator 202 includes elements of a turbine inlet steam-condition prediction calculating section 211, a first-stage steam-condition prediction calculating section 212, a first-stage rotor-radial-direction temperature-distribution prediction calculating section 213, a thermal stress prediction calculating section 214, an inter-stage portion steam-condition prediction calculating section 215, a rotor-axial-direction temperature-distribution prediction calculating section 216, a casing steam-condition prediction calculating section 217, a casing-axial-direction temperature-distribution prediction calculating section 218, and a thermal expansion difference prediction calculating section 219.

The turbine inlet steam-condition prediction calculating section 211 calculates a transfer process of heat and a substance from the gas turbine 10 through the exhaust heat recovery boiler 20 to the high-pressure steam turbine 31, based on the flow rate of supply of the fuel gas measured by the flowmeter 103. Then, conditions (specifically, a flow rate, pressure, and temperature) of steam in an inlet of the high-pressure steam turbine 31 are predicted and calculated, based on the calculated result.

The first-stage steam-condition prediction calculating section 212 predicts and calculates conditions (specifically, a flow rate, pressure, temperature, and a heat transfer rate) of the steam in a first inter-stage portion (first-stage steam) of the high-pressure steam turbine 31, based on the calculation result of the turbine inlet steam-condition prediction calculating section 211, in consideration of a pressure drop in the first inter-stage portion of the high-pressure steam turbine 31.

The first-stage rotor-radial-direction temperature-distribution calculating section 213 calculates heat transfer from the first-stage steam to the turbine rotor, based on the calculation result of the first-stage steam-condition prediction calculating section 212, thereby predicting and calculating temperature distribution of the turbine rotor in the radial direction thereof in the high-pressure steam turbine 31.

The thermal stress prediction calculating section 214 calculates the mechanics of materials using a linear expansion coefficient, Young's modulus, Poisson's ratio, or the like of the turbine rotor, based on the calculation result of the first-stage rotor-radial-direction temperature-distribution prediction calculating section 213, thereby predicting and calculating thermal stress of the turbine rotor in the high-pressure steam turbine 31. Further, the calculated value of the thermal stress is corrected using the measurement value data.

The inter-stage portion steam-condition prediction calculating section 215 predicts and calculates conditions (specifically, a flow rate, pressure, temperature, and a heat transfer rate) of the steam in respective inter-stage portions (respective-stage steam) of the high-pressure steam turbine 31, based on the calculation result of the turbine inlet steam-condition prediction calculating section 211, in consideration of pressure drops in the respective inter-stage portions of the high-pressure steam turbine 31.

The rotor-axial-direction temperature-distribution prediction calculating section 216 calculates the heat transfer from respective-stage steam to the turbine rotor, based on the calculation result of the inter-stage portion steam-condition prediction calculating section 215, thereby predicting and calculating temperature distribution of the turbine rotor in the axial direction thereof in the high-pressure steam turbine 31.

The casing steam-condition prediction calculating section 217 predicts and calculates conditions (specifically, a flow rate, pressure, temperature, and a heat transfer rate) of the steam in the casing, based on the calculation result of the turbine inlet steam-condition prediction calculating section 211, in consideration of a pressure drop in the turbine casing.

The casing-axial-direction temperature-distribution prediction calculating section 218 calculates the heat transfer from the casing steam to the casing, based on the calculation result of the casing steam-condition prediction calculating section 217, thereby predicting and calculating temperature distribution of the casing in the axial direction thereof in the high-pressure steam turbine 31.

The thermal expansion difference prediction calculating section 219 calculates the mechanics of materials using linear expansion coefficients of the turbine rotor and the casing, based on the calculation results of the rotor-axial-direction temperature-distribution prediction calculating section 216 and the casing-axial-direction temperature-distribution prediction calculating section 218, thereby calculating an amount of thermal expansion of the turbine rotor and an amount of thermal expansion of the casing in the high-pressure steam turbine 31. Then, a difference between both amounts allows a difference in thermal expansion therebetween to be predicted and calculated. Further, the predicted value of the difference in thermal expansion is corrected using the measurement value data.

Figure 3:
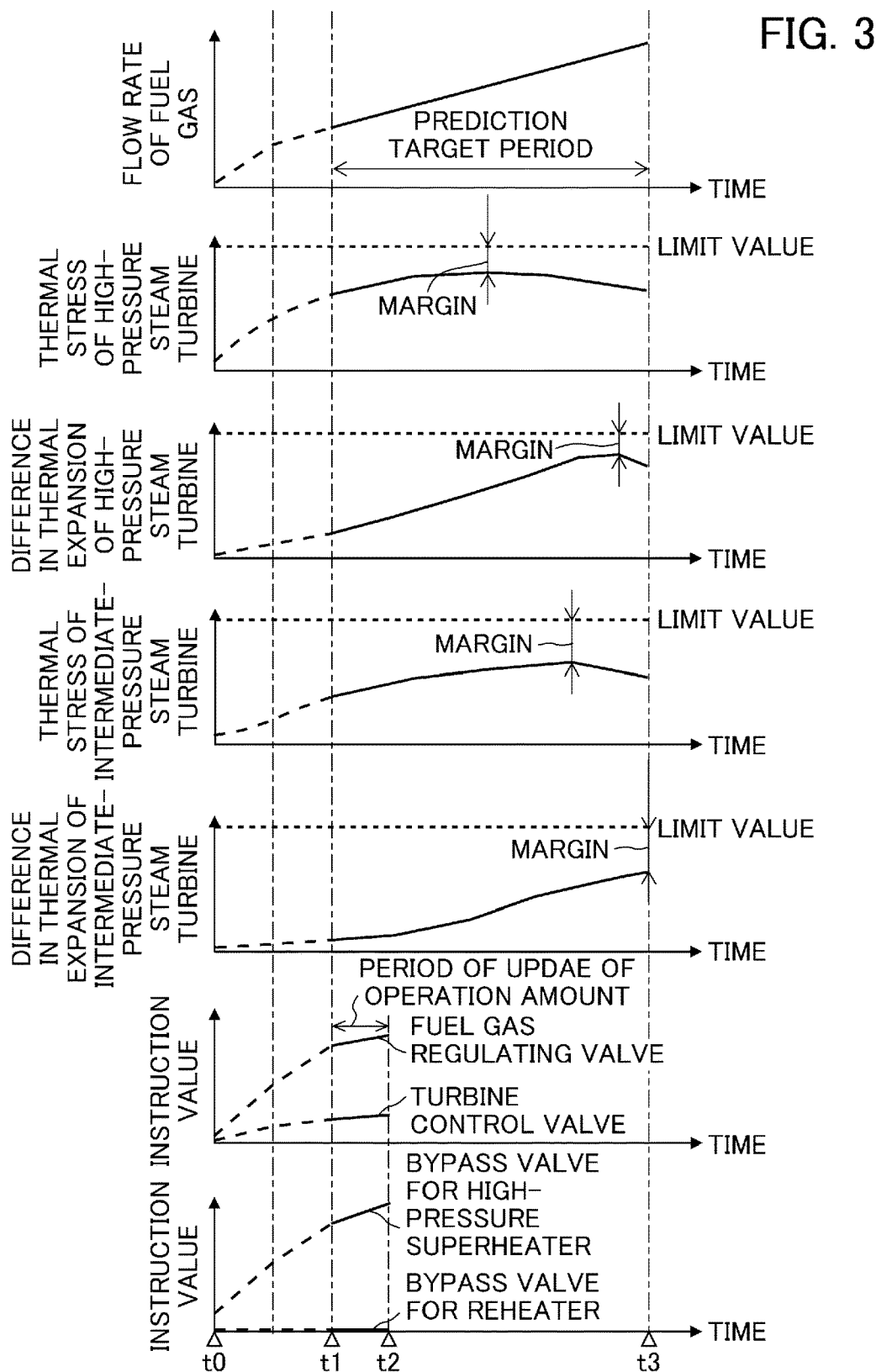
FIG. 3 illustrates timecharts for describing start-up control of the combined cycle power plant according to the first embodiment of the invention.

Next, the start-up control of the combined cycle power plant will be described. FIG. 3 illustrates timecharts for describing the start-up control of the combined cycle power plant according to the embodiment.

A flow rate of the fuel gas from a time point t0 to the current time point t1 (here, t0<t1) is changed, for example, as shown along a dotted line in the first graph in FIG. 3. In the prediction calculators 202 and 203, a flow rate of the fuel gas during a prediction target period from the time point t1 to a time point t3 (here, t1<t3) is predicted and calculated, based on the flow rate of the fuel gas at the current time point t1 measured in the flowmeter 103 (refer to a solid line in the first graph in FIG. 3). Here, in order to secure a speed by reducing an amount of calculation, it is assumed that the flow rate of the fuel gas during the prediction target period is changed at a rate of change in the time point t1, and then the flow rate of the fuel gas is linearly calculated.

Subsequently, in the prediction calculator 202, a change in the thermal stress and the difference in thermal expansion of the high-pressure steam turbine 31 during the same period is predicted and calculated, based on the predicted change in the flow rate of the fuel gas during the prediction target period (refer to solid lines in the second graph and the third graph in FIG. 3). Similarly, in the prediction calculator 203, a change in the thermal stress and the difference in thermal expansion of the intermediate-pressure steam turbine 32 during the same period is predicted and calculated, based on the predicted change in the flow rate of the fuel gas during the prediction target period (refer to solid lines in the fourth graph and the fifth graph in FIG. 3). Here, the prediction target period is a period (response delay time) between an occurrence of a change in an amount of heat generated in the gas turbine 10 and an occurrence of a change in the thermal stress and the difference in thermal expansion, or a period set to be longer than the period. The response delay time is set to a value obtained in theory or experience.

In the thermal effect-amount margin calculator 204, a deviation (thermal-stress margin) between a predicted peak value and a limit value of the thermal stress is calculated, based on the predicted change in the thermal stress of the high-pressure steam turbine 31 calculated in the prediction calculator 202. In addition, a deviation (thermal-expansion difference margin) between a predicted peak value and a limit value of the difference in thermal expansion is calculated, based on the predicted change in the difference in the thermal expansion of the high-pressure steam turbine 31 calculated in the prediction calculator 202. In addition, a deviation (thermal-stress margin) between a predicted peak value and a limit value of the thermal stress is calculated, based on the predicted change in the thermal stress of the intermediate-pressure steam turbine 32 calculated in the prediction calculator 203. In addition, a deviation (thermal-expansion difference margin) between a predicted peak value and a limit value of the difference in thermal expansion is calculated, based on a predicted change in the difference in the thermal expansion of the intermediate-pressure steam turbine 32 calculated in the prediction calculator 203.

In the load controller 205, instruction values within a period of an update of operation amount from the time point t1 to the time point t2 (here, t1<t2<t3) to the fuel gas regulating valve 102 and the turbine control valve 106 are calculated and output such that the thermal stress and the difference in thermal expansion of the high-pressure steam turbine 31 and the thermal stress and the difference in thermal expansion of the intermediate-pressure steam turbine 32 do not exceed the limit value, based on the thermal-stress margin and the thermal-expansion difference margin of the high-pressure steam turbine 31 and the thermal-stress margin and the thermal-expansion difference margin of the intermediate-pressure steam turbine 32 calculated by the thermal effect-amount margin calculator 204 (to be more exact, applying adjustment of the thermal-stress margin and the thermal-expansion difference margin by controlling the bypass valves 104 and 105 which will be described below) (refer to a solid line in the sixth graph in FIG. 3).

In the bypass controller 206, instruction values within the period of the update of operation amount from the time point t1 to the time point t2 are calculated and output to the bypass valve 104 for the high-pressure superheater and the bypass valve 105 for the reheater such that a difference between the thermal effect-amount margin of the high-pressure steam turbine 31 and the thermal effect-amount margin of the intermediate-pressure steam turbine 32 is smaller than a predetermined value, based on the thermal-stress margin and the thermal-expansion difference margin of the high-pressure steam turbine 31 and the thermal-stress margin and the thermal-expansion difference margin of the intermediate-pressure steam turbine 32 calculated by the thermal effect-amount margin calculator 204 (refer to a solid line in the seventh graph in FIG. 3).

A relationship between the openings of the bypass valves 104 and 105 and the difference between the thermal effect-amount margin of the high-pressure steam turbine 31 and the thermal effect-amount margin of the intermediate-pressure steam turbine 32 is described. When the opening of the bypass valve 104 is increased, and thus the flow rate of the steam that bypasses the high-pressure superheater 21a is increased, the flow rate of the steam that passes through the high-pressure superheater 21a is decreased, and thus an amount of heat transfer from the exhaust gas to the high-pressure superheater 21a is decreased. In this manner, the temperature of the main steam that is supplied to the high-pressure steam turbine 31 is lowered, then, the amount of thermal effect of the high-pressure steam turbine 31 is decreased, and the thermal effect-amount margin is increased. In addition, an amount of heat of the exhaust gas which flows into the reheater 22 is increased, and thus an amount of heat transfer from the exhaust gas to the reheater 22 is increased. In this manner, the temperature of the reheated steam that is supplied to the intermediate-pressure steam turbine 32 rises, then, the amount of thermal effect of the intermediate-pressure steam turbine 32 is increased, and the thermal effect-amount margin is decreased.

Meanwhile, when the opening of the bypass valve 105 is increased, and thus the flow rate of the steam that bypasses the reheater 22 is increased, the flow rate of the steam that passes through the reheater 22 is decreased, and thus an amount of heat transfer from the exhaust gas to the reheater 22 is decreased. In this manner, the temperature of the reheated steam that is supplied to the intermediate-pressure steam turbine 32 is lowered, then, the amount of thermal effect of the intermediate-pressure steam turbine 32 is decreased, and the thermal effect-amount margin is increased. In addition, an amount of heat of the exhaust gas which flows into the high-pressure superheater 21b is increased, and thus an amount of heat transfer from the exhaust gas to the high-pressure superheater 21b is increased. In this manner, the temperature of the main steam that is supplied to the high-pressure steam turbine 31 rises, then, the amount of thermal effect of the high-pressure steam turbine 31 is increased, and the thermal effect-amount margin is decreased.

Therefore, in a case where the thermal effect-amount margin of the intermediate-pressure steam turbine 32 is greater than the thermal effect-amount margin of the high-pressure steam turbine 31, the opening of the bypass valve 104 for the high-pressure superheater is increased and the opening of the bypass valve 105 for the reheater is decreased, thereby making it possible to reduce the difference between the thermal effect-amount margins of both turbines. In contrast, in a case where the thermal effect-amount margin of the high-pressure steam turbine 31 is greater than the thermal effect-amount margin of the intermediate-pressure steam turbine 32, the opening of the bypass valve 105 for the reheater is increased and the opening of the bypass valve 104 for the high-pressure superheater is decreased, thereby making it possible to reduce the difference between the thermal effect-amount margins of both turbines.

It should be noted that the prediction calculators 202 and 203, the thermal effect-amount margin calculator 204, the load controller 205, and the bypass controller 206 repeat the procedure described above until the start-up of the combined cycle power plant is completed. FIG. 3 illustrates a case where the procedure described above is repeated three times from the time point t0 to the time point t2.

In the embodiment as above, the bypass valves 104 and 105 are controlled, the difference between the thermal effect-amount margin of the high-pressure steam turbine 31 and the thermal effect-amount margin of the intermediate-pressure steam turbine 32 is adjusted to be reduced, and then the fuel gas regulating valve 102 and the turbine control valve 106 are controlled, based on the adjusted thermal effect-amount margin of the high-pressure steam turbine 31 and the adjusted thermal effect-amount margin of the intermediate-pressure steam turbine 32. Therefore, it is possible to cause both the high-pressure steam turbine 31 and the intermediate-pressure steam turbine 32 to operate in a state in which the amounts of thermal effect thereof are close to the limit value, and thus it is possible to shorten the start-up time.

A second embodiment of the invention is described with reference to FIGS. 4 to 7B.

Figure 4:
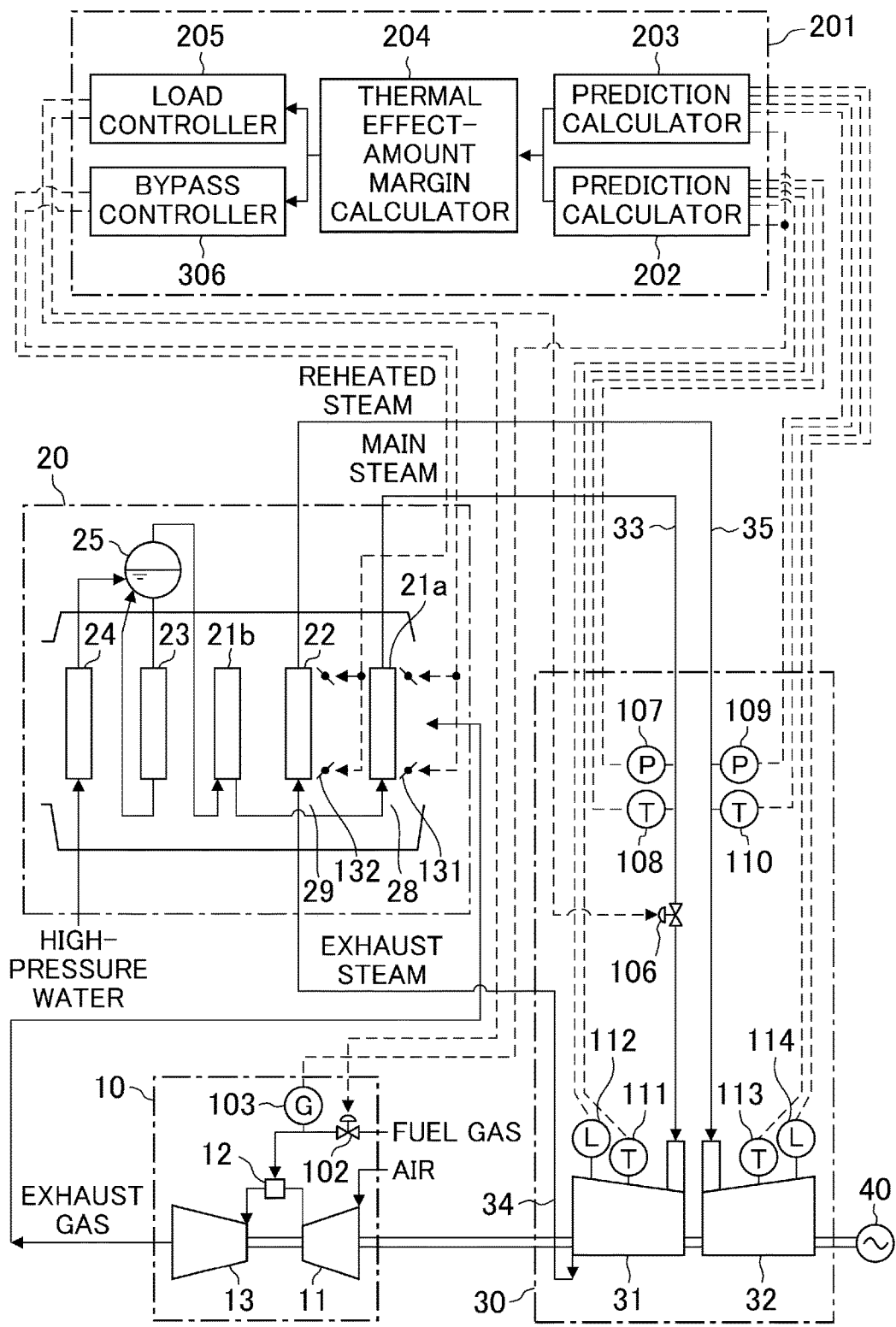
FIG. 4 is a schematic diagram illustrating a configuration of a combined cycle power plant according to a second embodiment of the invention.
Figure 5A:
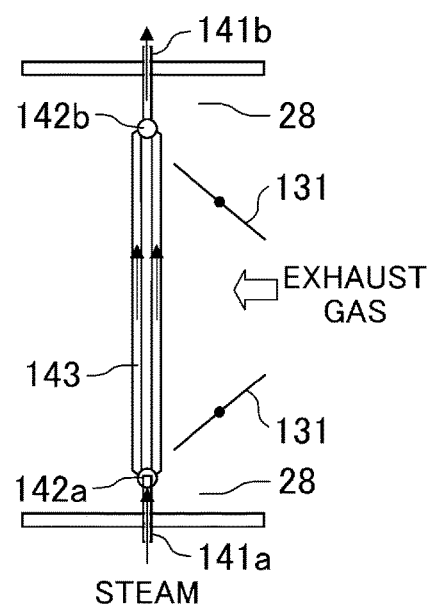
FIGS. 5A and 5B are views illustrating a structure of a high-pressure superheater and dampers according to the second embodiment of the invention.
Figure 5B:
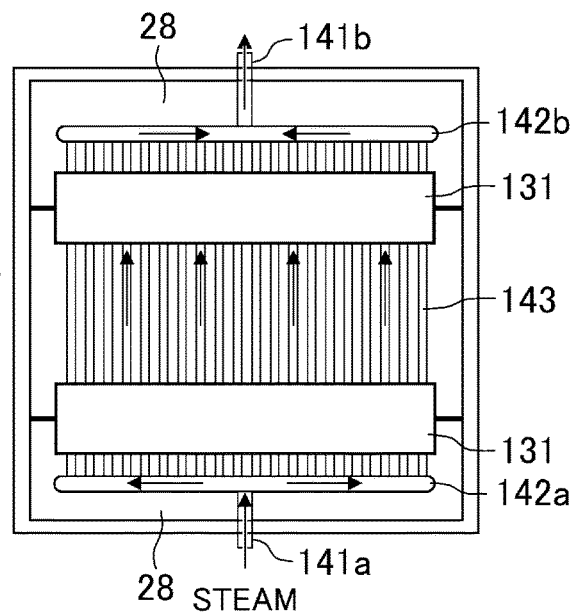
Figure 6A:
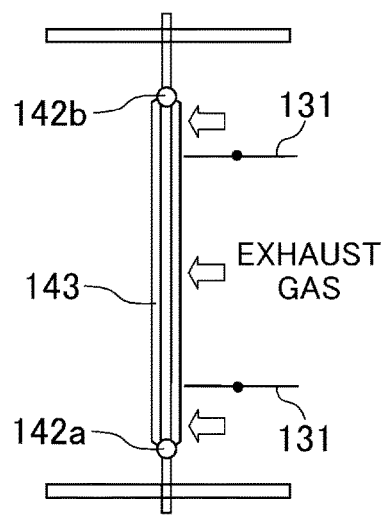
FIGS. 6A and 6B are views illustrating a movement of the dampers according to the second embodiment of the invention and an opened state of the dampers.
Figure 6B:
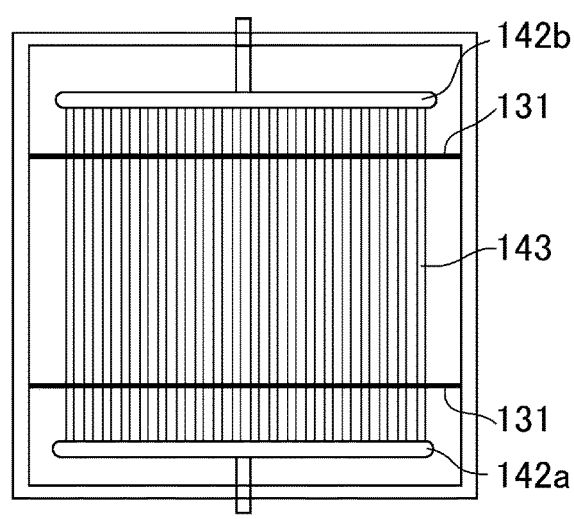
Figure 7A:
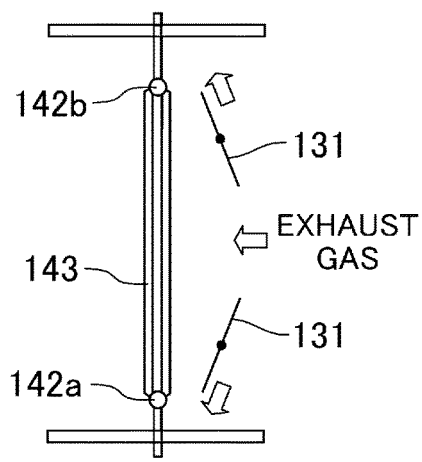
FIGS. 7A and 7B are views illustrating a movement of the dampers according to the second embodiment of the invention and a closed state of the dampers.
Figure 7B:
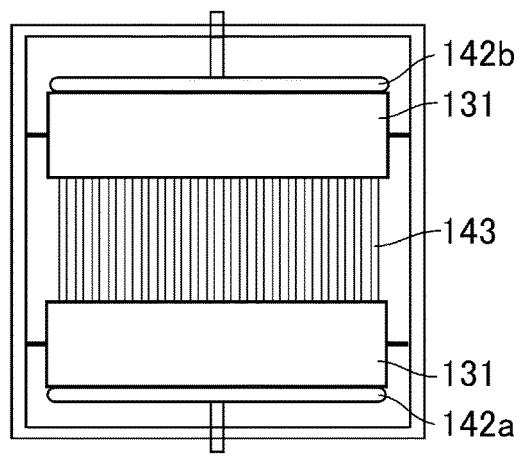

FIG. 4 is a schematic diagram illustrating a configuration of a combined cycle power plant according to the embodiment. FIG. 5A is a view illustrating a structure of the high-pressure superheater and dampers according to the embodiment of the invention, and FIG. 5B is a view from the upstream side in a flow direction of the exhaust gas in FIG. 5A. FIGS. 6A and 6B correspond to FIGS. 5A and 5B and illustrate a state in which the dampers are open. FIGS. 7A and 7B correspond to FIGS. 5A and 5B and illustrate a state in which the dampers are closed. It should be noted that the same reference signs are assigned to the same elements as those in the first embodiment, and thus description thereof is omitted.

In the embodiment, dampers 131 (bypass flow regulator) are provided on the upstream side of the high-pressure superheater 21a of the exhaust heat recovery boiler 20 in the flow direction of the exhaust gas. In this manner, bypass paths 28, through which the exhaust gas bypasses the high-pressure superheater 21a, are formed. The dampers 131 regulate a flow rate of the exhaust gas which flows through the bypass paths 28. In this manner, it is possible to regulate an amount of heat transfer from the exhaust gas to the high-pressure superheater 21a.

To be more specific, the high-pressure superheater 21a includes communication pipes 141a and 141b, headers 142a and 142b, and a plurality of heat transfer pipes 143. The steam from the high-pressure superheater 21b is guided to the header 142a through the communication pipe 141a, and then is divided to flow through the plurality of heat transfer pipes 143. In the heat transfer pipes 143, the heat transfers from the exhaust gas to the steam, thereby causing a rise in the temperature of the steam. The superheated steam is joined in the header 142b and is guided to the main steam pipe 33 through the communication pipe 141b.

The dampers 131 are disposed on both end sides of the heat transfer pipe 143 (that is, the header 142a side and the header 142b side). In this manner, the bypass paths 28, through which the exhaust gas flows on the header 142a side and the header 142b side without passing through the heat transfer pipe 143, are formed. Then, as illustrated in FIGS.

6A and 6B, in a state in which the dampers 131 are opened (an increase in the opening), the flow rate of the exhaust gas which passes through the heat transfer pipes 143 is increased (that is, the flow rate of the exhaust gas which flows through the bypass paths 28 is decreased), and thus the amount of heat which is transferred from the exhaust gas to the steam is increased. Meanwhile, as illustrated in FIGS. 7A and 7B, in a state in which the dampers 131 are closed (a decrease in the opening), the flow rate of the exhaust gas which passes through the heat transfer pipes 143 is decreased (that is, the flow rate of the exhaust gas which flows through the bypass paths 28 is increased), and thus the amount of heat which is transferred from the exhaust gas to the steam is decreased.

Dampers 132 (bypass flow regulator) are provided on the upstream side of the reheater 22 of the exhaust heat recovery boiler 20 in the flow direction of the exhaust gas. In this manner, bypass paths 29, through which the exhaust gas bypasses the reheater 22, are formed. The dampers 132 regulate a flow rate of the exhaust gas which flows through the bypass paths 29. In this manner, it is possible to regulate an amount of heat transfer from the exhaust gas to the reheater 22. It should be noted that, since the reheater 22 and the dampers 132 have substantially the same structures as the high-pressure superheater 21*a* and the dampers 131, description thereof is omitted.

A bypass controller 306 calculates and outputs instruction values to the dampers 131 and 132, based on the thermal effect-amount margin of the high-pressure steam turbine 31 and the thermal effect-amount margin of the intermediate-pressure steam turbine 32 calculated by the thermal effect-amount margin calculator 204, such that the difference between the margins is smaller than a predetermined value set in advance. In this manner, openings of the dampers 131 and 132 are regulated, for example, by PID control.

Then, in a case where the thermal effect-amount margin of the intermediate-pressure steam turbine 32 is greater than the thermal effect-amount margin of the high-pressure steam turbine 31, the opening of the dampers 131 for the high-pressure superheater is increased and the opening of the dampers 132 for the reheater is decreased, thereby making it possible to reduce the difference between the thermal effect-amount margins of both turbines. In contrast, in a case where the thermal effect-amount margin of the high-pressure steam turbine 31 is greater than the thermal effect-amount margin of the intermediate-pressure steam turbine 32, the opening of the dampers 132 for the reheater is increased and the opening of the dampers 131 for the high-pressure superheater is decreased, thereby making it possible to reduce the difference between the thermal effect-amount margins of both turbines.

In the embodiment as above, the dampers 131 and 132 are controlled, the difference between the thermal effect-amount margin of the high-pressure steam turbine 31 and the thermal effect-amount margin of the intermediate-pressure steam turbine 32 is adjusted to be reduced, and then the fuel gas regulating valve 102 and the turbine control valve 106 are controlled, based on the adjusted thermal effect-amount margin of the high-pressure steam turbine 31 and the adjusted thermal effect-amount margin of the intermediate-pressure steam turbine 32. Therefore, it is possible to cause both the high-pressure steam turbine 31 and the intermediate-pressure steam turbine 32 to operate in a state in which the amounts of thermal effect thereof are close to the limit value, and thus it is possible to shorten the start-up time.

A third embodiment of the invention is described with reference to FIG. 8.

Figure 8:
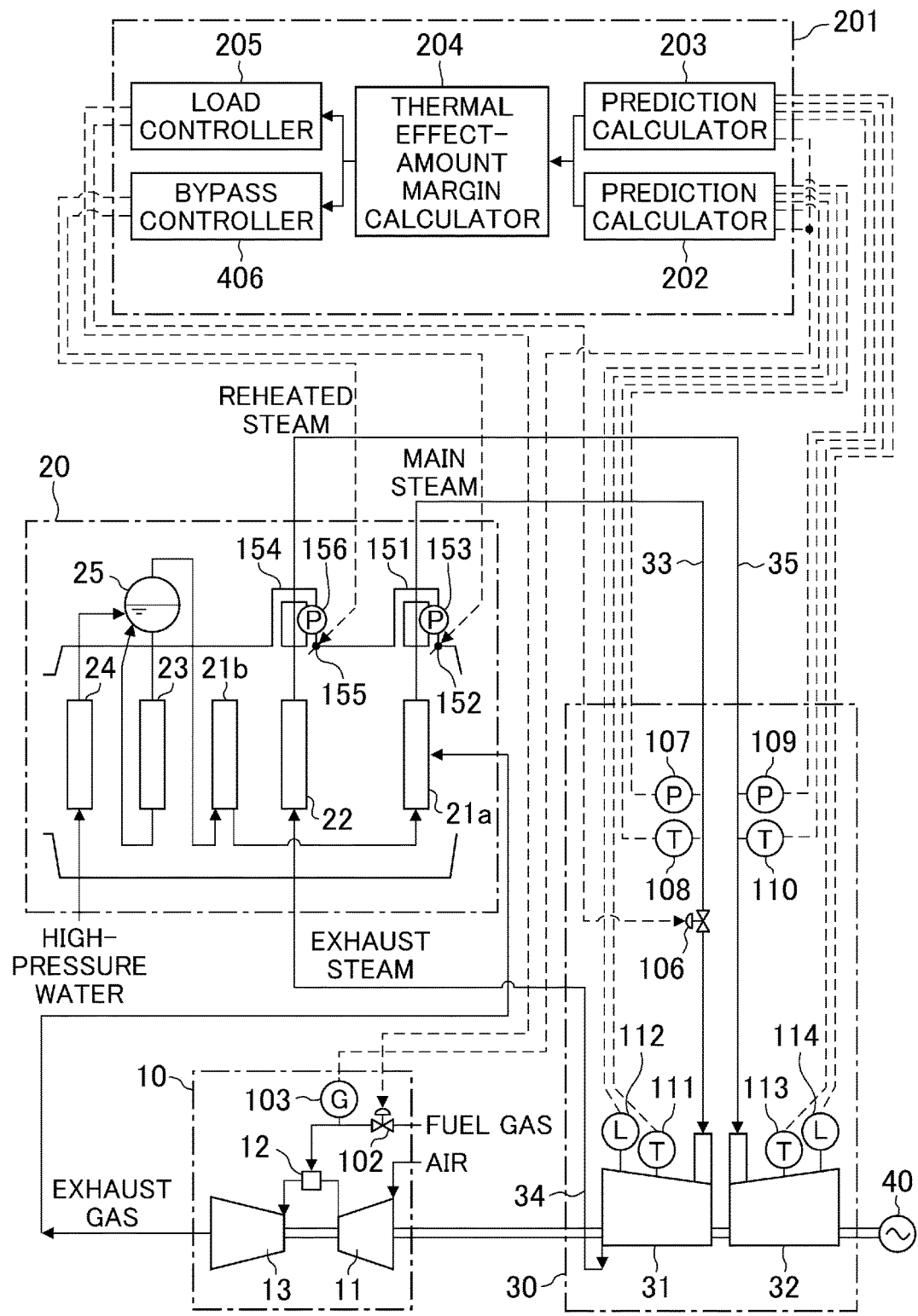
FIG. 8 is a schematic diagram illustrating a configuration of a combined cycle power plant according to a third embodiment of the invention.
Figure 9:
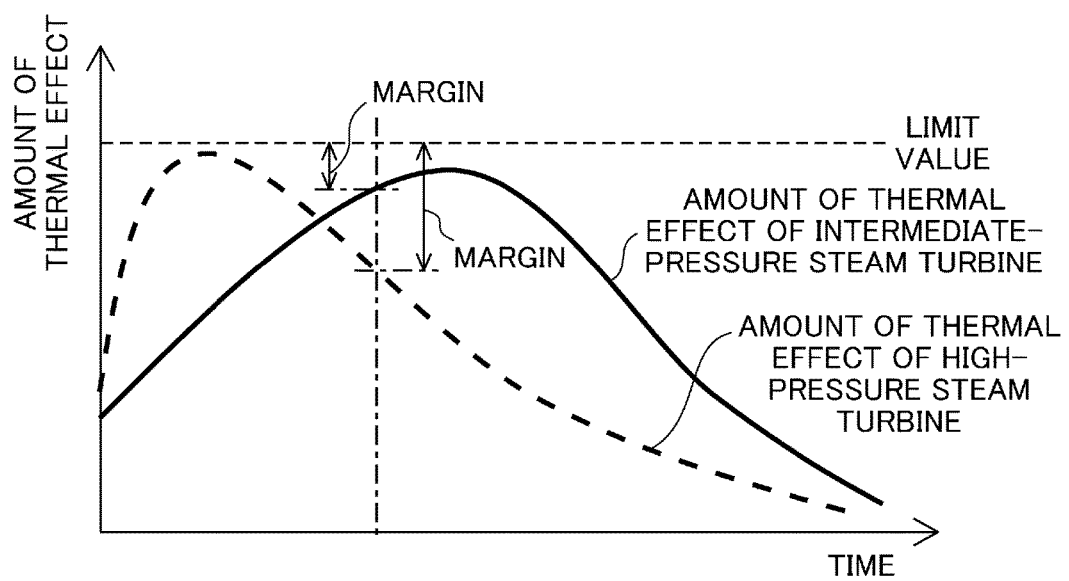
FIG. 9 is a graph indicating behavior due to an amount of thermal effect of a high-pressure steam turbine and an amount of thermal effect of an intermediate-pressure steam turbine at the time of start-up of a combined cycle power plant in the related art.

FIG. 8 is a schematic diagram illustrating a configuration of a combined cycle power plant according to the embodiment. It should be noted that the same reference signs are assigned to the same elements as those in the first and second embodiments, and thus description thereof is omitted.

In the embodiment, a bypass duct 151 (bypass path) for allowing the exhaust gas to bypass the high-pressure superheater 21*a* of the exhaust heat recovery boiler 20 is provided. A fan 153 and a duct damper 152 (bypass flow regulator) are provided on the bypass duct 151. The duct damper 152 regulates a flow rate of the exhaust gas which flows through the bypass duct 151. In this manner, it is possible to regulate an amount of heat transfer from the exhaust gas to the high-pressure superheater 21*a*.

A bypass duct 154 (bypass path) for allowing the exhaust gas to bypass the reheater 22 of the exhaust heat recovery boiler 20 is provided. A fan 156 and a duct damper 155 (bypass flow regulator) are provided on the bypass duct 154. The duck damper 155 regulates a flow rate of the exhaust gas which flows through the bypass duct 154. In this manner, it is possible to regulate an amount of heat transfer from the exhaust gas to the reheater 22.

A bypass controller 406 calculates and outputs instruction values to the duct dampers 152 and 155, based on the thermal effect-amount margin of the high-pressure steam turbine 31 and the thermal effect-amount margin of the intermediate-pressure steam turbine 32 calculated by the thermal effect-amount margin calculator 204 such that the difference between the margins is smaller than a predetermined value set in advance. In this manner, openings of the duct dampers 152 and 155 are regulated, for example, by PID control.

Then, in the case where the thermal effect-amount margin of the intermediate-pressure steam turbine 32 is greater than the thermal effect-amount margin of the high-pressure steam turbine 31, the opening of the bypass duct damper 152 for the high-pressure superheater is increased and the opening of the bypass duct damper 155 for the reheater is decreased, thereby making it possible to reduce the difference between the thermal effect-amount margins of both turbines. In contrast, in the case where the thermal effect-amount margin of the high-pressure steam turbine 31 is greater than the thermal effect-amount margin of the intermediate-pressure steam turbine 32, the opening of the bypass duct damper 155 for the reheater is increased and the opening of the bypass duct damper 152 for the high-pressure superheater is decreased, thereby making it possible to reduce the difference between the thermal effect-amount margins of both turbines.

In the embodiment as above, the duct dampers 152 and 155 are controlled, the difference between the thermal effect-amount margin of the high-pressure steam turbine 31 and the thermal effect-amount margin of the intermediate-pressure steam turbine 32 is adjusted to be reduced, and then the fuel gas regulating valve 102 and the turbine control valve 106 are controlled, based on the adjusted thermal effect-amount margin of the high-pressure steam turbine 31 and the adjusted thermal effect-amount margin of the intermediate-pressure steam turbine 32. Therefore, it is possible to cause both the high-pressure steam turbine 31 and the intermediate-pressure steam turbine 32 to operate in a state in which the amounts of thermal effect thereof are close to the limit value, and thus it is possible to shorten the start-up time.

It should be noted that, in order to reduce the difference between the thermal effect-amount margin of the high-pressure steam turbine and the thermal effect-amount margin of the intermediate-pressure steam turbine, the case where the bypass valves 104 and 105 are controlled in the first embodiment, the case where the dampers 131 and 132 are controlled in the second embodiment, and the case where the duct dampers 152 and 155 are controlled in the third embodiment, are described; however, any one of the first to third embodiments may be combined with another embodiment thereof.

In the first to third embodiments, the case of a single axis type, in which the gas turbine 10 and the steam turbine 30 are joined on the single axis, is described; however, the configuration is not limited thereto, and a multi-axis type may be employed, in which the gas turbine 10 and the steam turbine 30 are joined on separate axes from each other.

What is claimed is:

1. A combined cycle power plant comprising:
   a gas turbine that is driven with hot gas generated using fuel gas;
   a high-pressure steam turbine and an intermediate-pressure steam turbine that are driven with steam;
   a generator that converts rotative power of the gas turbine, the high-pressure steam turbine, and the intermediate-pressure steam turbine into electric power;
   an exhaust heat recovery boiler that uses exhaust gas from the gas turbine as a heat source, and includes a high-pressure superheater which superheats high-pressure steam and supplies a superheated steam to the high-pressure steam turbine, and a reheater which reheats exhaust steam from the high-pressure steam turbine and supplies a reheated steam to the intermediate-pressure steam turbine;
   a plurality of bypass paths through which the steam or the exhaust gas bypasses each of the high-pressure superheater and the reheater;
   a plurality of bypass flow regulators that regulate flow rates of the steam or the exhaust gas which flows through the plurality of bypass paths;
   a bypass controller that controls the plurality of bypass flow regulators such that a difference between a thermal effect-amount margin of the high-pressure steam turbine and a thermal effect-amount margin of the intermediate-pressure steam turbine is smaller than a predetermined value set in advance;
   a fuel gas regulating valve and a turbine control valve that regulate a plant load;
   a load controller that controls the fuel gas regulating valve and the turbine control valve;
   a measuring instrument that measures a state quantity of the plant;
   a prediction calculator that calculates a predicted value of an amount of thermal effect of the high-pressure steam turbine and a predicted value of an amount of thermal effect of the intermediate-pressure steam turbine, based on the state quantity of the plant measured by the measuring instrument; and
   a thermal effect-amount margin calculator that calculates the thermal effect-amount margin of the high-pressure steam turbine and the thermal effect-amount margin of the intermediate-pressure steam turbine, based on the predicted value of the amount of the thermal effect of the high-pressure steam turbine and the predicted value of the amount of the thermal effect of the intermediate-pressure steam turbine calculated by the prediction calculator,
   wherein the bypass controller controls the plurality of bypass flow regulators, based on the thermal effect-amount margin of the high-pressure steam turbine and the thermal effect-amount margin of the intermediate-pressure steam turbine calculated by the thermal effect-amount margin calculator, such that a difference between the margins is smaller than the predetermined value, and
   wherein the load controller controls the fuel gas regulating valve and the turbine control valve, based on the thermal effect-amount margin of the high-pressure steam turbine and the thermal effect-amount margin of the intermediate-pressure steam turbine adjusted by controlling the plurality of bypass flow regulators.

2. The combined cycle power plant according to claim 1, further comprising:
   a first bypass pipe through which the steam bypasses the high-pressure superheater;
   a first bypass valve that regulates a flow rate of the steam which flows through the first bypass pipe;
   a second bypass pipe through which the steam bypasses the reheater; and
   a second bypass valve that regulates a flow rate of the steam which flows through the second bypass pipe,
   wherein the bypass controller controls the first and second bypass valves such that a difference between the thermal effect-amount margin of the high-pressure steam turbine and the thermal effect-amount margin of the intermediate-pressure steam turbine is smaller than the predetermined value.

3. The combined cycle power plant according to claim 1, further comprising:
   a first bypass path through which the exhaust gas bypasses the high-pressure superheater;
   a first damper that regulates a flow rate of the exhaust gas which flows through the first bypass path;
   a second bypass path through which the exhaust gas bypasses the reheater; and
   a second damper that regulates a flow rate of the exhaust gas which flows through the second bypass path,
   wherein the bypass controller controls the first and second dampers such that a difference between the thermal effect-amount margin of the high-pressure steam turbine and the thermal effect-amount margin of the intermediate-pressure steam turbine is smaller than the predetermined value.

4. The combined cycle power plant according to claim 1, further comprising:
   a first bypass duct through which the exhaust gas bypasses the high-pressure superheater;
   a first fan provided in the first bypass duct;
   a first duct damper that regulates a flow rate of the exhaust gas which flows through the first bypass duct,
   a second bypass duct through which the exhaust gas bypasses the reheater;
   a second fan provided in the second bypass duct;
   a second duct damper that regulates a flow rate of the exhaust gas which flows through the second bypass duct,
   wherein the bypass controller controls the first and second duct dampers such that a difference between the thermal effect-amount margin of the high-pressure steam turbine and the thermal effect-amount margin of the intermediate-pressure steam turbine is smaller than the predetermined value.

5. A start-up method of a combined cycle power plant which includes
   a gas turbine that is driven with hot gas generated using fuel gas;

a high-pressure steam turbine and an intermediate-pressure steam turbine that are driven with steam;

a generator that converts rotative power of the gas turbine, the high-pressure steam turbine, and the intermediate-pressure steam turbine into electric power;

an exhaust heat recovery boiler that uses exhaust gas from the gas turbine as a heat source, and includes a high-pressure superheater which superheats high-pressure steam and supplies a superheated steam to the high-pressure steam turbine, and a reheater which reheats exhaust steam from the high-pressure steam turbine and supplies a reheated steam to the intermediate-pressure steam turbine;

a plurality of bypass paths through which the steam or the exhaust gas bypasses each of the high-pressure superheater and the reheater; and a plurality of bypass flow regulators that regulate flow rates of the steam or the exhaust gas which flows through the plurality of bypass paths, the start-up method comprising:

controlling the plurality of bypass flow regulators such that a difference between a thermal effect-amount margin of the high-pressure steam turbine and a thermal effect-amount margin of the intermediate-pressure steam turbine is smaller than a predetermined value set in advance;

calculating a predicted value of an amount of thermal effect of the high-pressure steam turbine and a predicted value of an amount of thermal effect of the intermediate-pressure steam turbine, based on a state quantity of the plant measured by a measuring instrument;

calculating the thermal effect-amount margin of the high-pressure steam turbine and the thermal effect-amount margin of the intermediate-pressure steam turbine, based on the predicted value of the amount of the thermal effect of the high-pressure steam turbine and the predicted value of the amount of the thermal effect of the intermediate-pressure steam turbine;

controlling the plurality of bypass flow regulators, based on the thermal effect-amount margin of the high-pressure steam turbine and the thermal effect-amount margin of the intermediate-pressure steam turbine, such that a difference between the margins is smaller than the predetermined value; and controlling a fuel gas regulating valve and a turbine control valve, based on the thermal effect-amount margin of the high-pressure steam turbine and the thermal effect-amount margin of the intermediate-pressure steam turbine adjusted by controlling the plurality of bypass flow regulators, thereby adjusting a plant load.

* * * * *